Patented Mar. 8, 1949

2,463,776

UNITED STATES PATENT OFFICE 2,463,776

PRODUCTION OF LACTONES

David Gwyn Jones and Fred Dean, Norton-on-Tees, England, assignors to Imperial Chemical Industries Limited, a corporation of Great Britain No Drawing. Application March 20, 1947, Serial No. 736,109. In Great Britain March 29, 1946

5 Claims. (Cl. 260—344)

This invention relates to the production of lactones.

According to the present invention gamma-butyrolactone is produced by treating tetrahydrofuran or a lower alkyl-substituted tetrahydrofuran, in which the alkyl substituent group is in the 2-position, at a temperature below its boiling point with nitrogen tetroxide. Preferably the reaction is conducted at atmospheric pressure since increase of pressure tends to over-oxidation. Preferably also the reaction is carried out under conditions which initially at least are substantially anhydrous, and therefore substantially dry reactants are employed.

Examples of suitable alkyl substituted tetrahydrofurans are 2-methyl tetrahydrofuran, that is sylvan, and 2-ethyl tetrahydrofuran. Best yields are obtained when tetrahydrofuran itself is employed, the equation for the reaction being:

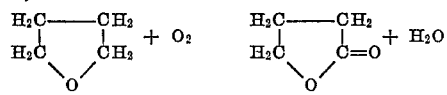

It is desirable to operate at temperatures above 20° C. since below this there is danger of nitrogen tetroxide accumulating in the liquid and, consequently, of an uncontrollable reaction developing. Preferably temperatures of 30°–50° C. are employed, and more preferably 30°–40° C. In general it is desirable to operate at as low a temperature as possible bearing in mind the aforesaid disadvantages associated with this, since with increase of temperature there is increasing tendency for over-oxidation to occur. Careful control of temperature is therefore desirable, and this may be effected by using cooling coils, and/or an external cooling bath.

It is preferred to keep the molar ratio of nitrogen tetroxide to tetrahydrofuran at 1.5:1 or less, since otherwise succinic acid will be the major product. Preferably the nitrogen tetroxide is mixed with air or oxygen, and preferably it is bubbled through the liquid, thus serving to agitate the reaction mixture. The nitrogen tetroxide may if desired be produced in situ, for example from nitrogen trioxide or nitric oxide and oxygen or air, but it is preferred to employ substantially pure nitrogen tetroxide. The reaction may be conducted in the presence of an anhydrous solvent which is chemically inert to the reactants and products, e. g. ether or dioxan. It is convenient to conduct the reaction under reflux.

The process may be conducted in continuous manner. The gamma-butyrolactone may be recovered from the reaction product by distillation.

The invention is illustrated but not limited by the following examples.

Example 1

92 gms. (1 mole) of nitrogen tetroxide was entrained in a stream of oxygen and passed into 72 gms. (1 mole) of tetrahydrofuran during 8 hours. The temperature was maintained at 40°–50° C. by means of an external cooling bath. When the reaction had ceased, oxygen was blown through the liquid product until all of the nitrogen trioxide had been removed. The product was fractionally distilled under reduced pressure to give gamma-butyrolactone in 29% yield.

The gamma-butyrolactone was characterised by preparation of the phenyl hydrazide, which was found to melt at 94° C.

Example 2

43.4 gms. of tetrahydrosylvan dissolved in 100 mls. of ether was oxidized by bubbling through it while under reflux excess of nitrogen tetroxide and oxygen, the temperature being 30°–40° C. There was a gain in weight of 30–40 gms. during the reaction. The reaction product was stripped of $N_2O_4$ and the residue was distilled under about 2 mms. absolute pressure. Gamma-acet-propanol and gamma-butyrolactone were obtained as products.

We claim:

1. The process for the production of gamma-butyrolactone which comprises reacting a saturated furan compound selected from the group consisting of tetrahydrofuran, 2-methyl tetrahydrofuran and 2-ethyl tetrahydrofuran with not more than 1.5 mole of nitrogen tetroxide per mole of said furan compound at a temperature within the range of 20 to 50° C.

2. The process for the production of gamma-butyrolactone which comprises reacting tetrahydrofuran with not more than 1.5 mole of nitrogen tetroxide per mole of said furan compound at a temperature within the range of 20 to 50° C.

3. The process for the production of gamma-butyrolactone which comprises passing a mixture of oxygen and nitrogen tetroxide through tetrahydrofuran at a temperature within the range of 30 to 40° C. until from 1 to 1.5 mole of said tetroxide per mole of tetrahydrofuran has reacted and then recovering said lactone by fractional distillation of the reaction mixture.

4. The process for the production of gamma-butyrolactone which comprises passing a mixture of oxygen and nitrogen tetroxide through tetrahydrofuran at a temperature within the range of 30 to 40° C. until a quantity of said mixture equivalent to approximately 1 mole of said tetroxide per mole of tetrahydrofuran has passed through and then recovering said lactone by fractional distillation of the reaction mixture.

5. The process of claim 4 in which said mixture is passed through said tetrahydrofuran during a period of approximately 8 hours.

DAVID GWYN JONES.
FRED DEAN.

REFERENCES CITED

The following references are of record in the file of this patent:

UNITED STATES PATENTS

| Number | Name | Date |
|---|---|---|
| 2,312,468 | Ebel | Mar. 2, 1943 |

OTHER REFERENCES

Morton Chemistry of Heterocyclic Compounds, page 11, (1946), McGraw Hill.